(12) United States Patent
Mørk et al.

(10) Patent No.: US 6,239,224 B1
(45) Date of Patent: May 29, 2001

(54) METHOD OF PRODUCTION OF PARTICULATE POLYMERS

(75) Inventors: Preben Cato Mørk, Trondheim; Svein Tøgersen, Oslo, both of (NO)

(73) Assignee: Polymer Systems AS (NO)

( * ) Notice: Subject to any disclaimer, the term of this patent is extended or adjusted under 35 U.S.C. 154(b) by 0 days.

(21) Appl. No.: 09/072,859

(22) Filed: May 5, 1998

(30) Foreign Application Priority Data

Oct. 10, 1997 (GB) .................................................. 9721603

(51) Int. Cl.[7] .................................................. C08F 257/00
(52) U.S. Cl. .................. 525/242; 526/346; 526/909; 523/205; 521/56; 521/146
(58) Field of Search ................ 523/205; 521/56; 521/146; 526/201, 346, 909; 525/242

(56) References Cited

U.S. PATENT DOCUMENTS

| | | | |
|---|---|---|---|
| 4,247,434 | 1/1981 | Vanderhoff et al. | 260/29.6 |
| 4,307,134 | 12/1981 | Milkovich et al. | 427/222 |
| 4,333,969 | 6/1982 | Wright et al. | 427/222 |
| 4,352,916 | 10/1982 | Landoll | 526/200 |
| 4,385,156 | 5/1983 | Ingram et al. | 525/253 |
| 4,419,245 | 12/1983 | Barrett et al. | 210/681 |
| 4,459,378 | * 7/1984 | Ugelstad | 526/201 X |
| 4,500,692 | 2/1985 | Wright | 526/201 |
| 4,609,512 | 9/1986 | Rigler et al. | 264/53 |
| 4,675,363 | 6/1987 | DiGiulio | 525/242 |
| 4,731,388 | 3/1988 | Matsui et al. | 521/56 |
| 4,791,162 | 12/1988 | Vanderhoff et al. | 524/458 |
| 4,996,265 | 2/1991 | Okubo et al. | 525/242 |
| 5,147,937 | 9/1992 | Frazza et al. | 525/243 |
| 5,189,069 | 2/1993 | Speikamp et al. | 521/56 |
| 5,292,814 | 3/1994 | Bayer et al. | 525/243 |
| 5,432,210 | 7/1995 | Bogan, Jr. | 523/201 |

FOREIGN PATENT DOCUMENTS

| | | |
|---|---|---|
| 1 093 747 | 1/1981 | (CA) . |
| 1 255 237 | 12/1971 | (GB) . |
| 1 416 405 | 12/1976 | (GB) . |
| 2 075 994 | 9/1983 | (GB) . |

* cited by examiner

*Primary Examiner*—Fred Teskin
(74) *Attorney, Agent, or Firm*—Testa, Hurwitz & Thibeault, LLP

(57) ABSTRACT

The invention provides a process for the preparation of a particulate polymer having a mode particle size of at least 200 μm, the improvement comprising the use of substantially monodisperse polymeric particles as polymerization seeds in a suspension polymerization preparation of said particulate polymer.

34 Claims, 2 Drawing Sheets

METHOD OF PRODUCTION OF PARTICULATE POLYMERS

FIELD OF THE INVENTION

This invention relates to improvements in the production of particulate polymers, in particular expandable polystyrene (EPS).

BACKGROUND OF THE INVENTION

Millions of tonnes of expandable polystyrene are produced each year. The EPS is produced in bead form and is used for the manufacture of a wide range of products ranging for example from thin-walled cups to packaging materials to large blocks used in construction.

The different end uses require EPS beads of different sizes, typically as follows:

200–600 µm—Cups and trays

400–800 µm—Thin-walled packaging materials

600–1100 µm—Normal packaging materials

900–2000 µm—Insulation boards and block materials.

EPS beads falling outside these target size ranges are typically considered to be "off-specification" material and command substantially lower prices.

EPS is normally produced by a suspension polymerization process in which styrene is polymerized in the presence of a free radical generator. The polystyrene (PS) beads produced in this way are impregnated with a blowing agent, typically a $C_{3-6}$ hydrocarbon such as pentane, to produce the expandable polystyrene (EPS) beads.

Suspension polymerization however produces PS beads with a broad size distribution and the PS or EPS beads must be size-classified, i.e. separated into fractions having the appropriate particle size range for the desired end use.

Although variation of the suspension polymerization conditions may allow the EPS producer to optimize the fraction of polymer beads having the particular desired size, e.g. for thin-walled packaging materials, a large proportion of the total bead yield will still be in less desired grades or will be of off-specification sizes.

Sekisui, in GB-A-1416405, describe a process in which the suspension polymerization of styrene is effected in the presence of polystyrene seeds of a size smaller than the desired mode size of the end product.

Typically the Sekisui process may be performed as a two-stage suspension polymerization. The first stage is terminated when relatively small beads, e.g. having a mode size of about 900 µm, have been formed. The small beads are then graded to remove overly small and overly large fractions leaving PS seeds, e.g. having sizes of 400 to 1800 µm, and the seeds are then used in the second of the suspension polymerization stages to yield PS beads having a narrower size distribution about the desired particle size than is achieved in the conventional suspension polymerization. Even this process however yields a product which has a broad particle size distribution and the complexity of the grading procedure is increased since it must be carried out on the smaller particles produced in the first polymerization stage.

The grades of EPS produced by the conventional and Sekisui processes contain a range of particle sizes, e.g. particle diameters differing by several hundreds of micrometers. This has a deleterious effect on the processing of EPS beads into expanded polystyrene products.

In expanded polystyrene product formation, EPS beads are first pre-expanded to produce free flowing expanded particles, typically using steam at a temperature below 100° C., and then tempered in a silo through which air is passed, before being filled into a mould and steamed, typically at 110 to 120° C., to complete expansion and fusion of the particles.

The tempering period is required for the pre-expanded particles to develop the necessary resilience for the moulding process.

The particle size distribution in the EPS beads is not simply replicated in the pre-expanded beads, instead the size distribution is broadened and a broad density distribution is created as under the same conditions the smaller EPS beads will expand less and the larger beads more leading to the tempering silo containing a mixture which includes small high density particles and larger low density particles. Settling out of the smaller higher density particles occurs in the tempering silo resulting in non-uniformity of the pre-expanded particle mixture fed from the silo to the moulds and accordingly to variations in the final densities and strengths of the moulded products. Thus the broad particle size distribution for the graded EPS beads and hence of the pre-expanded particles leads to difficulties in production of expanded polystyrene products and makes the product quality inconsistent and difficult to control.

We have now found that it is possible to produce substantially monodisperse (i.e. single sized) polymeric seed particles which can be used in suspension polymerization to generate larger but still substantially monodisperse polymer particles, for example substantially monodisperse EPS particles with a size suitable for one of EPS's typical end uses.

Since the product is substantially monodisperse, mechanical grading is not required thereby leading to considerable savings in terms of production equipment and process duration. Moreover undesired grades are not produced thereby leading to a considerable increase in effective yield and a reduction in waste. Furthermore the problems associated with a broad particle size range within a graded EPS product are avoided or reduced.

SUMMARY OF THE INVENTION

Viewed from one aspect the invention thus provides the use of substantially monodisperse polymeric particles as polymerization seeds in a suspension polymerization preparation of a particulate polymer having a mode particle size of at least 200 µm, preferably at least 300 µm.

Viewed from a further aspect the invention provides a process for the preparation of polymer particles of a first mode size which is at least 200 µm, preferably at least 300 µm, wherein a suspension polymerization is effected using a suspension containing polymer seed of a second mode size which is smaller than said first mode size, characterized in that as said polymer seed is used a substantially monodisperse particulate polymer.

Viewed from a further aspect the invention provides a particulate polymer material, e.g. a suspension polymerization product, having a mode particle size of between 60 and 3000 µm, especially between 100 and 2500 µm, in particular between 150 and 2000 µm, more particularly 200 to 1500 µm, e.g. 250 to 1000 µm and more especially 300 to 700 µm, and a CV of less than 12% (preferably no more than 10% and more preferably no more than 5%), with the proviso that where the mode particle size is above 700 µm the CV is below 10% (and more preferably below 7.5%), and optionally with the proviso that where the mode particle size is above 200 µm the polymer material is a styrenic material, e.g. a polystyrene.

Viewed from a yet further aspect the invention provides a process for the preparation of polymer particles of a first mode size which is in the range 200 to 300 μm, which process comprises:

(a) obtaining a first substantially monodisperse particulate polymer seed material having a mode size of no more than 100 μm, preferably no more than 60 μm, more preferably no more than 50 μm;

(b) using said first seed material, performing a suspension polymerization to yield a second substantially monodisperse particulate polymer seed material having a mode size greater than that of said first seed material and not more than 150 μm, preferably not more than 100 μm and more preferably not more than 10 μm;

(c) using said second seed material, performing a suspension polymerization to yield a third substantially monodisperse particulate polymer seed material having a mode size greater than that of said second seed material and not more than 1000 μm;

(d) using said third seed material or a seed material derived therefrom, performing a suspension polymerization to yield polymer particles of said first mode size; and (e) optionally impregnating and/or heat treating and/or surface modifying the particulate product of step (d).

In this process, one or more of steps (b), (c) and (d) may, but preferably do not, involve removal of over- or undersized particles from the seed material so produced so as to yield a substantially monodisperse seed material.

Viewed from a further aspect the invention also provides a process for the preparation of polymer particles by seeded suspension polymerization, characterised in that as seeds are used polymer particles having a CV of less than 12% and a mode particle size of between 60 and 1000 μm (preferably between 100 and 800 μm and more preferably 300 to 700 μm) and in that polymerization is so effected that the ratio of the mode particle size of the seeds to that of the suspension polymerization product is in the range 1:1.4 to 1:3, preferably 1:1.58 to 1:2.72, more preferably 1:1.81 to 1:2.47.

BRIEF DESCRIPTION OF THE DRAWINGS

Light microscope images of polymer particles produced by the process of the invention are shown in FIGS. 1 and 2 of the accompanying drawings.

DETAILED DESCRIPTION OF THE INVENTION

Figure 1:
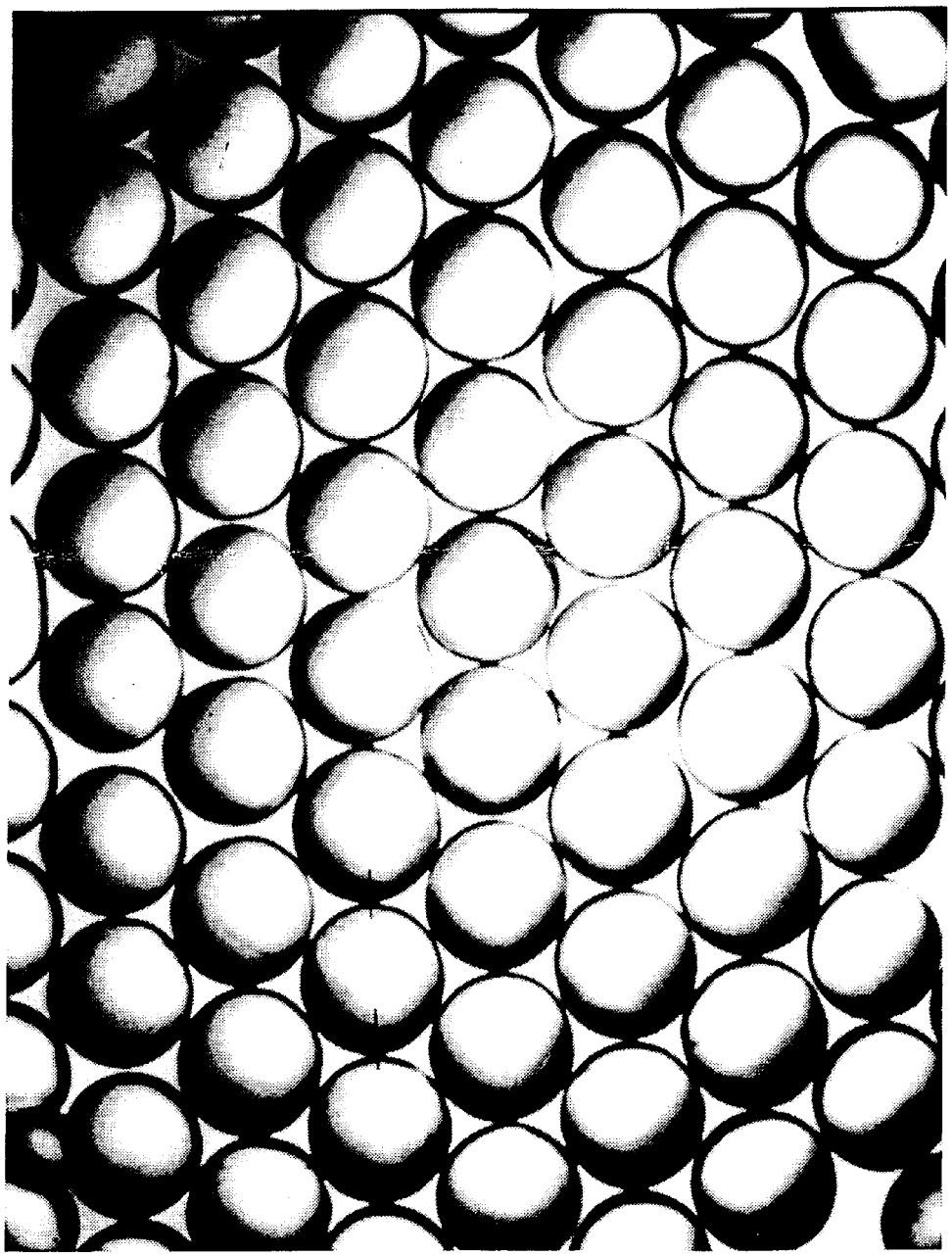

The total number of suspension polymerization stages used in the processes of the invention will typically be up to 12, preferably up to 8. Typically transition from below 50 μm to above 500 μm will require more than one stage, generally two or more preferably three or four stages. Conveniently, for seeds having sizes above 100 μm the particle volume growth per stage will be at least ×2.74, e.g. at least ×4, and less than ×30, preferably from ×5 to ×15. For seeds having sizes below 100 μm, the particle volume growth per stage will preferably be between ×2.74 and ×50, e.g. ×4 to ×40 more preferably between ×5 and ×30, especially preferably ×6 to ×15, e.g. about ×8.

If desired, a mixture of two or more populations of substantially monodisperse seeds having different mode diameters may be used in the present invention to produce a multimodal, preferably a bimodal, end product which can be graded relatively straightforwardly to produce different substantially monodisperse grades, e.g. corresponding to EPS grades preferred for different end uses. Where a bimodal product is produced for use without further size classification, it is preferred that the particle size of the smaller beads be comparable to (e.g. within 15% of) the diameter of the largest spheres which would fit into the void space between the larger beads when in close packed arrangement. Such a bimodal product is novel and forms a further aspect of the invention.

The processes of the invention are especially suitable for the production of EPS beads, but the processes may be used for the preparation of any particulate polymer producible by suspension polymerization, in particular styrenic homo- and copolymers and vinyl homo- and copolymers. Examples of appropriate monomers include vinyl aliphatic monomers such as esters of acrylic and methacrylic acids, acrylonitrile, and vinyl aromatic monomers such as styrene and substituted styrenes.

By mode particle size is meant the peak particle size for detectable particles, observed in the particle size distribution determined using particle size determination apparatus such as a Coulter LS 130 particle size analyzer e.g. a mode particle size in the distribution of particle size against percentage of total particle volume.

By substantially monodisperse it is meant that for a plurality of particles (e.g. at least 100, more preferably at least 1000) the particles have a coefficient of variation (CV) of less than 20%, for example less than 15%, preferably less than 12%, more preferably less than 11%, still more preferably less than 10% and most preferably no more than about 8%. CV is determined in percentage as $$CV = \frac{100 \times \text{standard deviation}}{\text{mean}}$$

where mean is the mean particle diameter and standard deviation is the standard deviation in particle size. CV is preferably calculated on the main mode, ie. by fitting a monomodal distribution curve to the detected particle size distribution. Thus some particles below or above mode size may be discounted in the calculation which may for example be based on about 90% of total particle number (of detectable particles that is). Such a determination of CV is performable on a Coulter LS 130 particle size analyzer.

The degree of monodispersity required for the seeds and enlarged particles of each enlargement stage tends to vary as enlargement progresses. For the initial and early stage seeds, a high degree of monodispersity is desirable and grading of the product may also be desirable. Thus in general if the product of a polymerization stage has a CV of about 25%, it will preferably be graded to produce a seed having a CV of less than 25%, preferably less than 20% for the subsequent stage. For seeds having a mode size of less than 150 μm, the CV is especially preferably below 5%. For seeds having a mode size of greater than 150 μm the CV is preferably at or below about 10%.

The separate polymerization stages in the processes of the invention are characterized by being carried out in different reactor chambers or by being carried out in the same reactor chamber but with addition of further monomer and desirably also further suspension medium. The further monomer is preferably added continuously until the desired amount of monomer has been added. This addition may be at a constant rate but more preferably the rate of addition is increased as addition progresses, with the increase being either gradual or stepwise.

The initial substantially monodisperse polymer seed material used for the processes of the invention may conveniently be produced by any process which yields a substantially monodisperse polymer product, e.g. by a dispersion polymerization process performed in an organic solvent or, more preferably, by the Sintef process described for example in U.S. Pat. No. 4,336,173 and U.S. Pat. No. 4,459,378. Monodisperse polymer particles produced by the Sintef process are sold commercially by Dyno Particles As of Norway under the trade name Dynospheres®, typically with mode particle sizes in the range 2 to 30 µm.

The Sintef process is an "activated swelling" process rather than a suspension polymerization because polymerization is only initiated after all the monomer has been absorbed into the starting polymer seeds. In contrast, as described herein, in a seeded suspension polymerization the growing seed is continuously contacting fresh monomer and initiator.

Less preferably, the initial polymer seed material may be produced by a process which yields a polydisperse product, e.g. a conventional suspension polymerization process, with the polydisperse product then being size separated to yield a substantially monodisperse particle population.

The initial monodisperse particles may be transformed into larger substantially monodisperse polymer seeds by a suspension polymerization process substantially as described in U.S. Pat. No. 5,147,937 (Frazza), with the number and duration of the individual polymerization stages being selected to yield a final substantially monodisperse seed product of the desired mode particle size. In general the desired mode particle size for the final seed product will conform to a size from which the final suspension polymerization product may be produced with the desired median particle size in one, or less preferably more than one, polymerization stages in a single reactor. Thus final seed mode sizes may typically be within ±10% of 170 µm, 340 µm, 600 µm and 925 µm for the manufacture of final product beads of mode sizes 400, 600, 1000 and 1300 µm, i.e. suitable for use as different grades of EPS beads for example.

It is particularly surprising that the substantial monodispersity of the particles is maintained despite the degree of particle growth that occurs, e.g. multistage growth from initial micron-sized Sintef particles up to millimeter sized end product.

It has been found that this multistage growth is advantageous since the polymerization process conditions can be separately optimized for each growth stage, and it allows the final growth stage to be effected using process conditions and controls conventional in the suspension polymerization production of millimeter sized particles.

The performance of the Sintef process to generate micron sized initial seeds is relatively time consuming and expensive and the time and expense rises steeply as the size of the particles increases. The commercially available Sintef particles are moreover too small to be used in a single step suspension polymerization to produce EPS particles of commercial grades and accordingly such particles did not represent an obvious candidate for use as polymer seeds for EPS, in part due to expense and in part due to the expectation that monodispersity would be lost during the growth process. However, using multistage suspension polymerization to achieve the growth process, not only is the monodispersity substantially retained but also the expense of the Sintef process is diluted—thus a 1 g of a 20 µm Sintef product can be transformed into about 275 kg of a 1300 µm end product.

The processes and products of the invention will now be described in further detail using by way of example the styrene polymerization system. However, as indicated above, while EPS is a particularly important product, the processes are applicable to other polymers and products.

The initial seed particles used are preferably polystyrene particles such as Dynospheres® (Dyno Particles AS, Lillestrøm, Norway) produced by the Sintef process, particularly preferably particles having a mode size in the range 0.5 to 50 µm, especially 5 to 30 µm, and most especially about 10–20 µm. Alternatively they may be size fractionated polystyrene particles produced by standard emulsion polymerization procedures, e.g. having a mode size of 0.05 to 1.0 µm, or polystyrene particles having a mode size of up to 20 µm, more particularly 1 to 10 µm, produced by dispersion polymerization in an organic solvent. The initial seed particles may then be enlarged in a stepwise suspension polymerization process substantially as described in U.S. Pat. No. 5,147,937 to produce final seed particles having a mode size of up to 1000 µm.

This process involves combining an aqueous dispersion of the seed particles with an aqueous emulsion of a water-insoluble monomer or monomer mixture and an oil soluble free radical polymerization initiator or a precursor therefor at such a rate that an amount of monomer or monomer mixture equal to the total initial seed polymer weight is combined with the dispersion over a period of 45 to 120, preferably 60 to 90, minutes. The combination is preferably effected at a temperature at least as high as that at which the initiator or precursor is activated and the reaction mixture is maintained at a temperature at which the initiator or precursor is activated until the seeds have grown by the desired amount, suitably until the monomer is exhausted. The procedure is then repeated until the final desired particle size is achieved. Particularly preferably, the monomer content of the reaction mixture is maintained at no more than 20%, more preferably no more than 10%, by weight of the polymer content at any given time.

Preferably each growth stage increases the particle volume by 1.1× to 50×, especially 2× to 30×, more preferably 4× to 20×, and most preferably 6× to 15×. Indeed stages preferably involve a volume increase of no more than 15× (ie. no more than a fifteen-fold volume increase).

The monomer used may be pure styrene or styrene derivative or may alternatively be a mixture of a styrene and/or a styrene derivative and optionally a non-styrenic comonomer, e.g. a conventional styrene comonomer. Styrene and styrene derivatives such as alkyl styrenes (e.g. $C_{1-3}$-alkyl styrenes such as o-methyl styrene, m-methyl-styrene, p-methyl-styrene, dimethyl styrene, ethyl styrene, ethyl-methyl-styrene, etc.) and halo styrenes (e.g. p-chlorostyrene or 2,4-dichlorostyrene), and other conventional or non-conventional styrenes may be used to produce homopolymers or copolymers. In general however styrenes and styrene in particular will preferably be the predominant or indeed the only monomer used for growth from the seed particles.

Other comonomers which may be used include ethylenically unsaturated monomers for example acrylic acids and esters (such as acrylic acid, methyl acrylate, ethyl acrylate, butylacrylate, methacrylic acid, methyl methacrylate and ethyl methylmethacrylate), maleic acid and esters thereof (e.g. dimethyl maleate, diethyl maleate and dibutyl maleate), fumaric acids and esters thereof (e.g. dimethyl fumarate and diethyl fumarate), vinyl monomers, and acrylonitrile.

Non styrenic comonomers will preferably make up 0% or 1 to 40% by weight of the polymer added in any growth stage.

The seed particles are preferably of a polymer analogous to or at least compatible with the polymer added during the growth stage for which the polymer seed is used. Thus the Sintef seeds are preferably predominantly styrenic polymers, especially on the surfaces thereof.

Besides simple ethylenic comonomers, comonomers which are capable of cross-linking can also be used, for example divinyl benzene and polyethylene glycol dimethacrylate. Such cross-linkable comonomers will generally be used in relatively small amounts.

Examples of suitable polymerization initiators include organic peroxides such as dibenzoyl peroxide, and lauroyl peroxide, peroxy esters such as t-butyl peroxybenzoate and t-butyl peroxypivalate and azo compounds such as azo bis isobutyronitrile and azo bisdimethylvaleronitrile. These may be used in conventional concentrations (e.g. 0.1 to 10%, preferably 0.2 to 4% by weight relative to the monomer), and are preferably added in solution in the monomer or monomer mixture or in an inert organic solvent, e.g. benzene, toluene or dichloropropane. Where an organic solvent is used, this is preferably in a minor amount relative to the polymer content.

It is preferred to use at least one oil soluble polymerization inhibitor which is disposed in the monomer or monomer mixture in order to prevent polymerization in the see-free monomer droplets and thereby nucleation of new particles. Such an inhibitor preferably has a high molecular weight (e.g. at least 300 dalton) and low-water-solubility to reduce diffusion through the water phase. The inhibitor may for example be a phenolic compound (such as 3,5-di-tert-butyl-4-hydroxytoluene, 1,1-bis(4-hydroxyphenyl)cyclohexane, 4,4-butylidene-bis(3-methyl-6-t.butyl phenol), 1,3,5-trimethyl-2,4,6-tris-(3,5-di-t.butyl-4-hydroxybenzyl) benzene (available as Irganox 1330), 2,2'-methylenebis(6-t.butyl-4-methyl phenol), a sulphur compound (such as dilaurylthiodipropionate, 4,4'-thiobis(3-methyl-6-t.butyl-phenol)), or an amine (such as N,N'-di-β-naphthyl-p-phenylenediamine and N-phenyl-N-isopropyl-p-phenylenediamine).

The inhibitor is conveniently used in quantities of 0.5 to 10%, preferably 1 to 5% by weight relative to the initiator.

As with conventional suspension polymerizations, it is also preferred to include one or more stabilizers in the reaction medium. It is particularly preferred to include a suspension stabilizer in the aqueous seed suspension and an emulsion stabilizer in the aqueous monomer emulsion which is added thereto. Examples of suitable stabilizers include ionic, ethoxylated ionic, non-ionic and polymeric amphiphilic molecules and inorganic particles, e.g. water-soluble high molecular weight materials, celluloses (including cellulose ethers for example hydroxyalkyl methylcelluloses such as hydroxypropylmethyl celluloses, available for example as Methocel K-100), polyols, polyvinylalcohols, polyalkylene oxides and inorganic materials such as calcium phosphate and magnesium pyrophosphate.

Thus for example emulsion stabilizers such as nonylphenol-polyethylene oxides containing 20 to 150 ethylene oxide units, may be used, e.g. Berol 274 or Igepal CO 990. Alternatively but less desirably ionic or ethoxylated ionic surfactants may be used. These stabilizers are preferably present in the monomer emulsion, e.g. at concentrations of 0.1 to 2%, preferably 0.2 to 1.0% by weight relative to the monomer content. Moreover the aqueous bead suspension will preferably contain a stabilizer such as a cellulose or cellulose ether or an inorganic stabilizer such as a phosphate (e.g. tricalcium phosphate). Preferably the suspension stabilizer used in the final polymerization stage or stages is an inorganic solid particulate which can readily be removed from the product in a washing step. Suspension stabilizers will generally be used at 0.5 to 15% by weight relative to the seed, more preferably 1 to 10%, especially 1 to 6% for inorganic particulates.

Typically seed preparation from smaller seeds may be effected in a reactor (e.g. a 1.5 L to 10 L autoclave reactor) equipped with stirrer, inlet and outlet ports and temperature controls.

The reactor is charged with initial or later stage seeds, suspension stabilizer, deionized water and when the seed is small (e.g. below 50 μm, especially below 30 μm) preferably also a water-soluble inhibitor such as sodium nitrate. Where an inhibitor is used in the early stages of particle growth this will typically be used at 0.001 to 0.005% by weight concentration in the water.

The seed is typically 10 to 60% by weight of the aqueous suspension and the stabilizer typically 0.5 to 15%, preferably 1 to 10% by weight relative to the seed.

The temperature of the seed suspension is typically raised to about 70 to 100° C., preferably 78 to 92° C. and a monomer emulsion is added.

The monomer emulsion is typically prepared by dissolving the oil-soluble initiator and the oil soluble inhibitor (e.g. dibenzoyl peroxide and Irganox 1330) in the styrene monomer (or monomer mixture) and mixing with an aqueous solution of an emulsion stabilizer (e.g. Berol 274 or Igepal CO 990). The oil (monomer) phase desirably makes up 30 to 60% by weight of the monomer emulsion which is prepared by any convenient emulsification technique, e.g. by use of a rotor-stator such as an Ultra-Turax.

Insofar as emulsification is concerned it is particularly important for smaller seeds to ensure that the monomer emulsion droplet size is small, and in general it is preferred that the monomer emulsion droplets should be smaller than the seed particles used in any given stage.

Accordingly, it is preferred to form the emulsion by passing the mixture through a plurality of rotor-stator stages, e.g. by using a rotor stator with interlocking radially separated concentric cylindrical flanges and grooves with the emulsion passing outward through slots in the cylindrical flanges and each flange thereby creating a separate shear force zone. In this way the production of oversized droplets is minimized. Alternatively the mixture may be passed sequentially through a series of separate rotor-stators or repeatedly cycled through a single rotor-stator mixer.

The emulsion is then conveniently fed continuously into the stirred suspension in the reactor, preferably using an adjustable feed rate pump. The feed rate is preferably kept at 0.1 to 2.0 g, especially 0.2 to 1.5 g and more especially about 0.5 g, monomer/hour per gram of polymer in the reactor, i.e. the emulsion feed rate is preferably increased during the period of addition. Once monomer addition is complete, the reaction mixture is stirred until monomer is exhausted, e.g. for about 2 hours, or polymerization is brought to an end by addition of a chaser (ie. a monomer composition with a high concentration of initiator).

At the end of each such polymerization stage, particle sizes are preferably determined (using a Coulter counter) and the quantities of monomer used in any subsequent stage calculated accordingly.

Where a polymerization stage is found to produce an undesirably large particle size distribution, the volume size increase should be reduced for subsequent performances of the same growth stage. However the product may still be used for further growth stages if it is graded to remove overly small or overly large particles.

After polymerization is complete, the enlarged particles may be removed and if desired washed to remove undesired stabilizers, initiator etc.

The stability of the polymerization suspension, and the molecular weight of the polymer produced depend on a range of variables (e.g. rate of monomer addition, initiator concentration, temperature, emulsion droplet size, seed size, etc.) in different ways.

Stability requires the avoidance of coagulation. This can typically be assured by ensuring that the monomer concentration in the seed particles does not exceed about 20–25% by weight, more preferably it does not exceed about 10 to 20% and especially preferably it does not exceed about 10% by weight. Avoidance of excess monomer concentration can be achieved by increasing initiator concentration (although this reduces the molecular weight of the polymer formed, the viscosity of the polymer and its glass transition temperature) or by reducing the rate of monomer addition (which increases polymer molecular weight and reaction time). Essentially therefore the operation of the process must balance initiator concentration and monomer addition rate to avoid coagulation and achieve the desired molecular weight within an acceptable process time.

The water contents of the phases may be varied generally without serious problems although if the suspension phase has too low a water content stability may be lost.

Likewise emulsifier, ie. emulsion stabilizer, content is generally not critical, although if too low stability is lost, and if too high micelle formation and hence fines formation may occur. In general the process of the invention may be operated with less than about 1% by weight fines being produced.

From a starting point of typically 10–20 $\mu$m Dynospheres®, magnification to full sized particles of for example 200 to 1300 $\mu$m mode size may typically be effected in 5 or more stages, e.g.

Stage 1—20 to 40 $\mu$m
Stage 2—40 to 80 $\mu$m
Stage 3—80 to 200 $\mu$m
Stage 4—200 to 400 $\mu$m
Stages 5 et seq.—400 to 600 or up to 1300 $\mu$m To produce EPS beads, the PS beads must be loaded with a blowing agent, ie. a material which is not a solvent for the polymer or which only slightly swells it and has a boiling point lower than the softening point of the polymer and is in gaseous or liquid form at ambient temperatures. Typically an optionally substituted aliphatic hydrocarbon having up to 8 carbons, preferably 3 to 5 carbons, and a boiling point in the range −50 to +50° C. is used, e.g. propane, pentane, cyclopentane, cyclobutane, methyl chloride, ethyl chloride, dichlorodifluoromethane (or other Freons), propylene, butylene, etc. Pentane or butane is preferred. The blowing agent is typically added during the final polymerization stage or stages or to the final polymerization product, optionally after recovery, washing, drying, etc. Mixtures of blowing agents can be used.

If desired, the particles may also be treated with a flame-retardant, e.g. hexabromocyclododecane, or they may be surface treated to attach other materials with a desired property, e.g. antistatic additives, or functional and reactive chemical groups.

Besides being useful for the preparation of EPS beads, the processes of invention may be used to produce polymer beads for many other applications. In particular, substantially monodisperse particles suitable for use as ion exchange resins (e.g. for water purification) may be prepared. Such resin beads will generally require some degree of cross-linking (e.g. with divinyl benzene) of the polymer matrix and may be derivatised after bead formation has occurred, e.g. by sulphonation by treatment with sulphuric acid to produce acidic ion exchange resin beads or by amination of a reactive comonomer used in the final stage or one of the later stages of polymerization, e.g. chloromethylstyrene, to produce a basic ion exchange resin. Such resins would have the advantage that with repeated use and flushing there would be a lesser tendency towards bead size separation occurring in the resin bed, a problem which leads to reduced performance. In general for ion exchange usage, bead sizes will be about 100 to 500 $\mu$m.

Further examples of applications include use as substrates for the generation of combinatorial chemistry libraries where the substantial monodispersity of the particles gives improved distribution of library members in library generation using split and mix techniques. For this application, the beads will generally be recited post production to introduce a surface functionality appropriate for attachment of the library members. Again bead sizes of 100 to 500 $\mu$m might typically be used.

The beads produced according to the invention may also be used as pigments for paints (e.g. to replace $TiO_2$), as spacers (e.g. in LCD's), as friction reducers, as lubricants, as carriers for cells, enzymes or catalysts, as carriers for drugs for sustained release formulations, as filters, as micro lenses, as carriers for additives for adhesives, as flow markers, or they may be thermoformed, e.g. by sintering, to produce filters or filter cakes with high uniformity of porosity.

For many of these uses, a degree of porosity is required for the particles, e.g. when they are for use as catalyst or enzyme carriers. This may be achieved relatively simply by controlling the degree of cross-linking of the polymer matrix and by including a porogen (e.g. toluene, pentane or any other volatile or gas generating agent which is non-reactive with the polymer) in the monomer emulsion used in the final stage or one of the later polymerization stages.

Where desired a porous particle may be loaded, e.g. with drug, catalyst, enzyme or the like, and then provided with a further polymer layer to seal in the load or to delay its release.

Porous particles may be used not simply as carriers but also as a source of controlled porosity in ceramics, polymer membranes, etc.

All documents referred to herein are hereby incorporated by reference.

The invention will now be described further with reference to the following non-limiting Examples.

EXAMPLE 1

A 10 L reactor was charged with 909 g of an aqueous suspension of 80 g 20 $\mu$m polystyrene Dynospheres®, 10.00 g of cellulosic ether, and 5171 g deionized water. The cellulosic ether was pre-dissolved in water the day beforehand.

The suspension was stirred at 170 rpm and heated to 80° C.

A styrene monomer emulsion was prepared by mixing 560 g styrene, 933 g water, 3.1 g Berol 274 stabilizer, 0.52 g Irganox 1330 inhibitor and 15.6 g of dibenzoylperoxide. This was emulsified for 2 minutes in an Ultra Turrax mixer and added to the reactor over 7 hours at a rate of 1 mL/min (1 hour), 2.5 mL/min (2 hours), 4.5 mL/min (2 hours), 5 mL/min (1 hour) and 6 mL/min (1 hour). The reaction was allowed to continue for 2 hours after monomer emulsion addition was complete.

The product was recovered and analysed for particle size distribution (using a Coulter LS 130 counter).

Mode: 43 $\mu$m
CV: 2.2%

EXAMPLE 2

726 g of an aqueous suspension of 80 g of a seed produced in Example 1 was charged into a 10 L reactor together with 10 g cellulosic ether, and 5138 g deionized water. Again the cellulosic ether had been dissolved in water the day beforehand.

The suspension was stirred at 170 rpm and heated to 80° C.

An emulsion was prepared using 560 g styrene, 15.6 g of dibenzoyl peroxide, 0.52 g Irganox 1330, 3.1 g Berol 274 and 933 g water, emulsified for 2 minutes in an Ultra Turrax mixer. This was added to the stirred suspension in the reactor over 7 hours at a rate of 1 mL/min (1 hour), 2.5 mL/min (2 hours), 4.5 mL/min (2 hours), 5 mL/min (1 hour) and 6 mL/min (1 hour). The reaction was allowed to continue for 2 hours after monomer emulsion addition was complete. The product was recovered and analyzed.

Mode: 83 $\mu$m
CV: 3.2%

EXAMPLE 3

842 g of an aqueous suspension of 80 g of a seed from Example 2 was charged into a 10 L reactor with 10 g cellulosic ether and 5238 g deionized water. The cellulosic ether had again been dissolved in water the day beforehand.

This was stirred at 150 rpm and heated to 80° C.

A styrene emulsion was prepared from 933 g water, 3.1 g Berol 274, 0.52 g Irganox 1330, 15.6 g of dibenzoyl peroxide and 640 g styrene. The mixture was emulsified for 2 minutes using an Ultra Turrax mixer before being added to the reactor over 7 hours at a rate of 1 mL/min (1 hour), 2.5 mL/min (2 hours), 4.5 mL/min (2 hours), 5 mL/min (1 hour) and 6 mL/min (1 hour). The reaction was allowed to continue for 2 hours after monomer emulsion addition was complete. The product was then recovered and analysed.

Mode: 170 $\mu$m
CV: 9.2%

EXAMPLE 4

80 g of a seed from Example 3 was charged into a 10 L reactor with 4.8 g cellulosic ether and 2400 g deionized water. The cellulosic ether had again been dissolved in water beforehand.

This was stirred at 170 rpm and heated to 90° C.

A styrene emulsion was prepared from 1760 g water, 12 g Igepal CO-990, 0.6 g Irganox 1330, 7.2 g of dibenzoyl peroxide and 880 g styrene. The mixture was emulsified for 2 minutes using an Ultra Turrax mixer before being added to the reactor over 13 hours at a rate of 1.25 mL/min (1hour), 1.7 mL/min (1 hour), 2.5 mL/min (2 hours), 3.3 mL/min (2 hours), 4.2 mL/min (5 hours), 5.8 mL/min (1 hour) and 7 mL/min (1 hour). The monomer addition was halted overnight after 8 hours and resumed for the final 5 hours on the next day. The reaction was allowed to continue for 2 hours after monomer emulsion addition was complete. The product was then recovered and analysed. A sample of the product is shown in FIG. 1 of the accompanying drawings.

Mode: 367 $\mu$m

EXAMPLE 5

20 g of seed product comprising mode 230 $\mu$m, CV 8% polystyrene beads (prepared analogously to Examples 1 to 3, by a three step expansion from 20 $\mu$m polystyrene Dynospheres® in a first step to about 60 $\mu$m, in a second to about 120 $\mu$m and in the third step to 230 $\mu$m) was charged into a 1.5 L reactor with 0.6 g cellulosic ether (predissolved in water) and 300 g deionized water. The mixture was stirred at 150 rpm and heated to 90° C.

A styrene emulsion was prepared from 185 g water, 1.3 g Igepal CO990, 70 mg Irganox 1330, 0.3 g of dibenzoylperoxide and 92 g styrene, emulsified for 2 minutes in an Ultra Turrax mixer. The emulsion was added to the reactor over 4 hours 40 minutes at 0.5 mL/min (1 hour), 0.7 mL/min (1 hour), 1.0 mL/min (1 hour) and 1.5 mL/min (100 minutes). Polymerization of the mixture was then allowed to continue for two hours. The product was recovered and analyzed.

Mode: 404 $\mu$m
CV: 10%

EXAMPLE 6

Example 5 was repeated but adding the emulsion over 6 hours at 0.5 mL/min (2 hours), 0.7 mL/min (1 hour) and 1.0 mL/min (3 hours). Polymerization of the mixture was then allowed to continue for two hours. The product was recovered and analyzed.

Mode: 401 $\mu$m
CV: 10%

EXAMPLE 7

Example 5 was repeated but using a reaction temperature of 95° C. Polymerization of the mixture was then allowed to continue for two hours. The product was recovered and analyzed.

Mode: 402 $\mu$m
CV: 9%

EXAMPLE 8

An aqueous suspension of 50 g of a polystyrene seed of mode diameter 399 $\mu$m (CV 8.4%) (e.g. as produced in Examples 5 to 7) in 1500 g water with 1.0 g of a cellulosic ether was charged into a 3 L glass reactor with a double spiral stirrer. The mixture was stirred at 150 rpm and heated to 90° C.

A styrene emulsion was prepared from 400 g water, 0.8 g Tween 20, 1.0 g dibenzoylperoxide and 200 g styrene, emulsified for two minutes in an Ultra Turrax mixture. The emulsion was added to the reactor over 11 hours at a rate of 0.8 mL/min. Polymerization was allowed to continue for two further hours. The product was recovered and analysed.

Mode: 635 $\mu$m
CV: 8.4%

EXAMPLE 9

An aqueous suspension of 50 g of a polystyrene seed of mode diameter 635 $\mu$m (from Example 8) in 750 g water with 0.35 g of a cellulosic ether was charged into a 3 L glass reactor with a double spiral stirrer. The mixture was stirred at 150 rpm and heated to 90° C.

A styrene emulsion was prepared from 600 g water, 1.2 g Tween 20, 3.0 g dibenzoylperoxide and 300 g styrene, emulsified for two minutes in an Ultra Turrax mixture. The emulsion was added to the reactor over 9 hours at 0.6 mL/min (2 hours) and 0.9 mL/min (7 hours). Polymerization was allowed to continue for two further hours. The product was recovered and analysed.

Mode: 980 $\mu$m
CV: 9.8%

Figure 2:
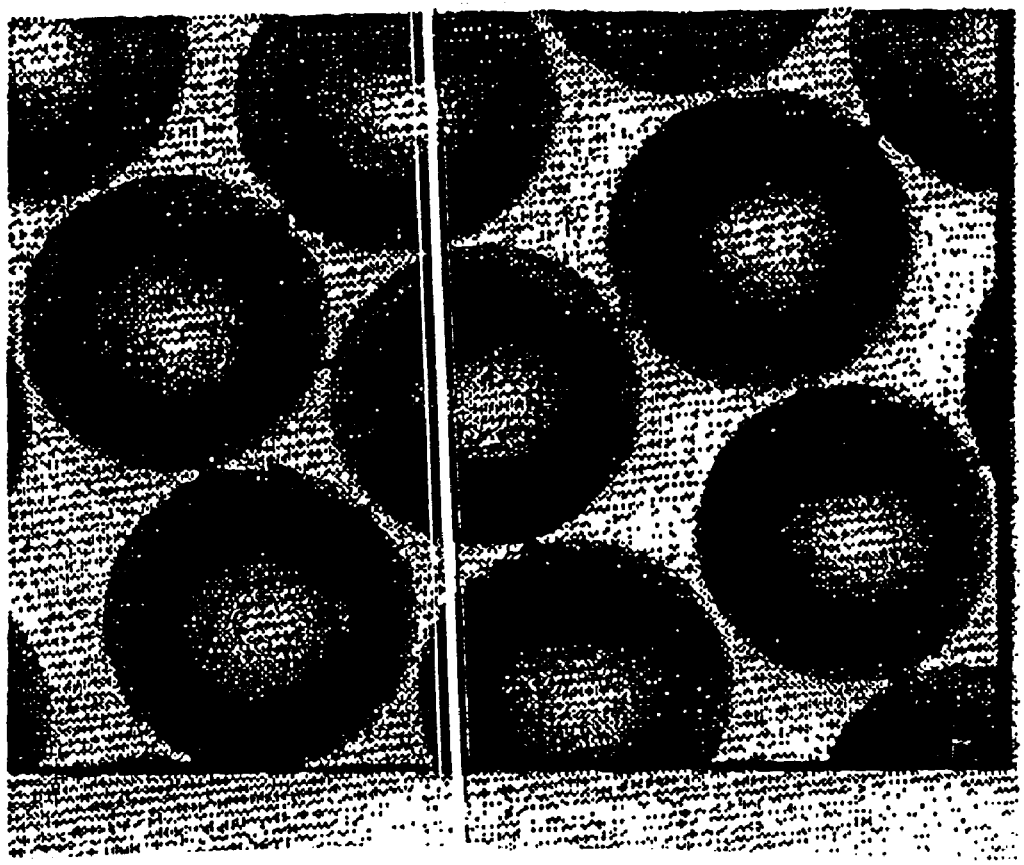

A light microscope image of the product is shown in FIG. 2 hereto.

What is claimed is:

1. In a process for the preparation of a particulate polymer having a mode particle size of at least 200 µm, the improvement comprising the use of substantially monodisperse polymeric particles as polymerization seeds in a suspension polymerization preparation of said particulate polymer.

2. A process as claimed in claim 1 wherein said particulate polymer comprises a polystyrene.

3. A process as claimed in claim 1 wherein the coefficient of variation of said seeds is less than 12%.

4. A process as claimed in claim 1 wherein said particulate polymer is produced by successive suspension polymerization steps involving a mean particle size expansion of from 1.4 to 3 in at least one of said steps.

5. A process as claimed in claim 1 wherein the particulate polymer is loaded with a blowing agent.

6. A process as claimed in claim 5 wherein the particulate polymer is subsequently transformed to an expanded polymer.

7. A process for the preparation of a moulded product wherein an expanded polymer as produced in claim 6 is transformed into a moulded expanded polymer product.

8. A process as claimed in claim 7 wherein said expanded polymer product is a container.

9. A process for the preparation of polymer particles of a first mode size which is at least 200 µm, wherein a suspension polymerization is effected using a suspension containing a polymer seed of a second mode size which is smaller than said first mode size, characterized in that said polymer seed is a substantially monodisperse particulate polymer.

10. A process as claimed in claim 9 wherein said substantially monodisperse particulate polymer comprises a polystyrene.

11. A process as claimed in claim 9 wherein the coefficient of variation of said seeds is less than 12%.

12. A process as claimed in claim 9 wherein said particulate polymer is produced by successive suspension polymerization steps involving a mean particle size expansion of from 1.4 to 3 in at least one of said steps.

13. A process as claimed in claim 9 wherein the particulate polymer is loaded with a blowing agent.

14. A process as claimed in claim 13 wherein the particulate polymer is subsequently transformed to an expanded polymer.

15. A process for the preparation of a moulded product wherein an expanded polymer as produced in claim 14 is transformed into a moulded expanded polymer product.

16. A process as claimed in claim 15 wherein said expanded polymer product is a container.

17. A process for the preparation of polymer particles of a first mode size which is in the range 200 to 3000 µm, which process comprises:

(a) obtaining a first substantially monodisperse particulate polymer seed material having a mode size of no more than 100 µm;

(b) using said first seed material, performing a suspension polymerization to yield a second substantially monodisperse particulate polymer seed material having a mode size greater than that of said first seed material and not more than 150 µm;

(c) using said second seed material, performing a suspension polymerization to yield a third substantially monodisperse particulate polymer seed material having a mode size greater than that of said second seed material and not more than 1000 µm;

(d) using a third seed material performing a suspension polymerization to yield polymer particles of said first mode size; and (e) optionally impregnating and/or heat treating and/or surface modifying the particulate product of step (d).

18. A process as claimed in claim 17 wherein said first substantially monodisperse particulate polymer seed material comprises a polystyrene.

19. A process as claimed in claim 1 wherein the coefficient of variation of said first seed material is less than 12%.

20. A process as claimed in claim 1 wherein said suspension polymerization steps involve a mean particle size expansion of from 1.4 to 3.

21. A process as claimed in claim 1 wherein in step (e) the particulate product is loaded with a blowing agent.

22. A process as claimed in claim 21 wherein the blowing agent loaded particulate product is subsequently transformed to an expanded polymer.

23. A process for the preparation of a moulded product wherein an expanded polymer as produced in claim 22 is transformed into a moulded expanded polymer product.

24. A process as claimed in claim 23 wherein said expanded polymer product is a container.

25. A process for the preparation of polymer particles by seeded suspension polymerization, characterised in that as seeds are used polymer particles having a CV of less than 12% and a mode particle size of between 60 and 1000 µm and in that polymerization is so effected that the ratio of the mode particle size of the seeds to that of the suspension polymerization product is in the range 1:1.4 to 1:3.

26. A process as claimed in claim 25 wherein said ratio is in the range 1:1.58 to 1:2.72.

27. A process as claimed in claim 25 wherein said polymer particles comprise a polystyrene.

28. A process as claimed in claim 25 wherein said polymer particles are loaded with a blowing agent.

29. A process as claimed in claim 28 wherein the blowing agent loaded polymer particles are subsequently transformed to an expanded polymer.

30. A process for the preparation of a moulded product wherein an expanded polymer as produced in claim 29 is transformed into a moulded expanded polymer product.

31. A process as claimed in claim 30 wherein said expanded polymer product is a container.

32. A process as claimed in claim 9 wherein said polymer particles comprise a polystyrene.

33. A process as claimed in claim 17 wherein step (d) further comprises the step of:

using one or more additional seed materials derived from said third seed material by one or more additional suspension polymerizations, performing a suspension polymerization to yield polymer particles of said first mode size.

34. A process as claimed in claim 17 wherein said polymer particles comprise a polystyrene.

* * * * *